United States Patent
Silverman et al.

(10) Patent No.: US 10,330,770 B2
(45) Date of Patent: Jun. 25, 2019

(54) CHANNEL ESTIMATION IN OFDMA FOR SWITCHED ANTENNA ARRAY BASED ANGLE-OF-ARRIVAL LOCATION

(71) Applicant: Cisco Technology, Inc., San Jose, CA (US)

(72) Inventors: Matthew A. Silverman, Shaker Heights, OH (US); Oscar Bejarano Chavez, Cleveland, OH (US); Paul J. Stager, Akron, OH (US); David Kloper, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 15/808,105

(22) Filed: Nov. 9, 2017

(65) Prior Publication Data
US 2019/0137596 A1 May 9, 2019

(51) Int. Cl.
*H04B 1/44* (2006.01)
*G01S 5/06* (2006.01)
*H04L 25/02* (2006.01)

(52) U.S. Cl.
CPC ............ *G01S 5/06* (2013.01); *H04L 25/0224* (2013.01)

(58) Field of Classification Search
CPC . G01S 5/06; H04L 25/0224; H04L 25/03891; H04B 1/44
USPC .................................................. 455/83, 13.3
See application file for complete search history.

(56) References Cited

U.S. PATENT DOCUMENTS

| 5,017,929 | A | | 5/1991 | Tsuda | |
|---|---|---|---|---|---|
| 5,343,212 | A | * | 8/1994 | Rose | G01S 11/04 342/424 |
| 6,006,110 | A | * | 12/1999 | Raleigh | H01O 3/2605 342/367 |
| 6,101,399 | A | * | 8/2000 | Raleigh | H01O 3/2605 342/367 |
| 6,219,561 | B1 | * | 4/2001 | Raleigh | H01O 3/2605 342/367 |
| 6,594,226 | B1 | | 7/2003 | Benning et al. | |
| 6,614,859 | B2 | * | 9/2003 | Lay | H01Q 3/26 375/316 |

(Continued)

FOREIGN PATENT DOCUMENTS

WO 2009/026020 A2 2/2009
WO 2012/063532 A1 5/2012

OTHER PUBLICATIONS

Balan, et al., "AirSync: Enabling Distributed Multiuser MIMO with Full Spatial Multiplexing," IEEE/ACM Transactions on Networking, Jul. 2012, pp. 1-15.

(Continued)

*Primary Examiner* — Hai V Nguyen
(74) *Attorney, Agent, or Firm* — Edell, Shapiro & Finnan, LLC (57) ABSTRACT

Techniques are presented herein for computing angle-of-arrival estimates while switching antenna states during a packet unit for the general Orthogonal Frequency Division Multiple Access (OFMDA) case (including a single user). A wireless device computes channel estimates throughout the entire frame and not only during the training symbols. Consequently, the wireless device computes channel estimates for all antennas in its array within a single frame instead of having to wait for multiple frames.

20 Claims, 8 Drawing Sheets

(56) References Cited

U.S. PATENT DOCUMENTS

| | | | |
|---|---|---|---|
| 6,665,545 B1* | 12/2003 | Raleigh | H01O 3/2605 455/273 |
| 7,200,392 B2 | 4/2007 | Kennedy, Jr. et al. | |
| 7,274,677 B1 | 9/2007 | Lewis | |
| 7,286,855 B2* | 10/2007 | Raleigh | H01O 3/2605 455/273 |
| 7,376,094 B2* | 5/2008 | Chun | H04B 7/086 370/295 |
| 7,436,359 B1* | 10/2008 | Rose | G01S 5/12 342/424 |
| 8,050,288 B2 | 11/2011 | Kapoor et al. | |
| 8,077,088 B2* | 12/2011 | Rose | G01S 5/12 342/424 |
| 8,207,892 B2 | 6/2012 | Abbasfar | |
| 8,213,957 B2* | 7/2012 | Bull | G01S 5/02 370/328 |
| 8,233,554 B2 | 7/2012 | Karabinis | |
| 8,233,920 B2 | 7/2012 | Gerstenberger et al. | |
| 8,254,847 B2 | 8/2012 | Sen | |
| 8,451,691 B2* | 5/2013 | Hall | F41J 5/06 367/118 |
| 8,503,283 B2 | 8/2013 | Kafle et al. | |
| 8,526,391 B2 | 9/2013 | Issakov et al. | |
| 8,537,916 B2 | 9/2013 | Karabinis | |
| 8,723,729 B2 | 5/2014 | Desai et al. | |
| 8,767,691 B2 | 7/2014 | Li et al. | |
| 8,768,344 B2* | 7/2014 | Naguib | G01S 5/021 455/424 |
| 8,792,586 B2* | 7/2014 | Ko | H04B 7/0639 375/299 |
| 8,831,594 B2* | 9/2014 | Naguib | G01S 5/021 455/424 |
| 8,924,155 B2 | 12/2014 | Waters et al. | |
| 9,002,349 B2* | 4/2015 | Naguib | G01S 5/021 455/424 |
| 9,143,211 B2* | 9/2015 | Pi | H04B 7/0465 |
| 9,332,523 B2 | 5/2016 | Zhang et al. | |
| 9,363,000 B2* | 6/2016 | Ko | H04B 7/0639 |
| 9,521,520 B2 | 12/2016 | Silverman et al. | |
| 9,641,964 B2* | 5/2017 | Kulkarni | H01Q 1/24 |
| 9,706,514 B2* | 7/2017 | Silverman | H04W 64/00 |
| 9,735,940 B1* | 8/2017 | Bakr | H04L 5/0053 |
| 9,806,779 B2* | 10/2017 | Ko | H04B 7/0639 |
| 9,810,764 B2* | 11/2017 | Shaw | H04W 64/006 |
| 9,860,688 B2* | 1/2018 | Kulkarni | H04W 4/02 |
| 9,866,293 B1* | 1/2018 | Da Silva | H04B 7/0456 |
| 9,877,299 B2* | 1/2018 | Smith | H04W 4/029 |
| 9,918,240 B2* | 3/2018 | Lee | H04B 7/0469 |
| 9,942,814 B1* | 4/2018 | Pawar | H04W 36/08 |
| 9,985,714 B1* | 5/2018 | Hou | H04B 7/15507 |
| 9,989,633 B1* | 6/2018 | Pandey | G01S 13/4454 |
| 9,998,856 B2* | 6/2018 | Edge | H04W 64/00 |
| 10,057,723 B2* | 8/2018 | Kulkarni | H01Q 1/24 |
| 10,178,697 B2* | 1/2019 | Pajovic | H04W 74/0816 |
| 10,181,885 B2* | 1/2019 | Ko | H04B 7/0639 |
| 10,187,835 B2* | 1/2019 | Pawar | H04W 36/08 |
| 2002/0122472 A1 | 9/2002 | Lay | H01Q 3/26 375/148 |
| 2003/0152099 A1* | 8/2003 | Chun | H04B 7/086 370/441 |
| 2005/0047322 A1 | 3/2005 | Sondur | |
| 2008/0051145 A1 | 2/2008 | Jin | |
| 2008/0080631 A1 | 4/2008 | Forenza et al. | |
| 2008/0118004 A1 | 5/2008 | Forenza et al. | |
| 2008/0130790 A1 | 6/2008 | Forenza et al. | |
| 2009/0034640 A1 | 2/2009 | Sondur | |
| 2009/0067402 A1 | 3/2009 | Forenza et al. | |
| 2009/0079634 A1* | 3/2009 | Rose | G01S 5/12 342/424 |
| 2009/0110087 A1 | 4/2009 | Liu et al. | |
| 2010/0130230 A1 | 5/2010 | Aggarwal et al. | |
| 2010/0172309 A1 | 7/2010 | Forenza et al. | |
| 2010/0234071 A1* | 9/2010 | Shabtay | H04B 7/0408 455/562.1 |
| 2010/0316163 A1 | 12/2010 | Forenza et al. | |
| 2011/0002371 A1 | 1/2011 | Forenza et al. | |
| 2011/0002410 A1 | 1/2011 | Forenza et al. | |
| 2011/0002411 A1 | 1/2011 | Forenza et al. | |
| 2011/0003606 A1 | 1/2011 | Forenza et al. | |
| 2011/0003607 A1 | 1/2011 | Forenza et al. | |
| 2011/0003608 A1 | 1/2011 | Forenza et al. | |
| 2011/0044193 A1 | 2/2011 | Forenza et al. | |
| 2011/0074633 A1* | 3/2011 | Pun | G01S 3/043 342/442 |
| 2011/0110195 A1* | 5/2011 | Hall | F41J 5/06 367/118 |
| 2012/0087430 A1 | 4/2012 | Forenza et al. | |
| 2012/0093078 A1 | 4/2012 | Perlman et al. | |
| 2012/0214512 A1 | 8/2012 | Siomina et al. | |
| 2012/0256726 A1 | 10/2012 | Honkanen et al. | |
| 2012/0257508 A1 | 10/2012 | Reunamaki et al. | |
| 2012/0314570 A1 | 12/2012 | Forenza et al. | |
| 2013/0034130 A1 | 2/2013 | Forenza et al. | |
| 2013/0039168 A1 | 2/2013 | Forenza et al. | |
| 2013/0051486 A1* | 2/2013 | Pi | H04B 7/0465 375/267 |
| 2013/0077660 A1* | 3/2013 | Ko | H04B 7/0639 375/219 |
| 2014/0070996 A1* | 3/2014 | Kneckt | H04W 64/006 342/386 |
| 2014/0098689 A1* | 4/2014 | Lee | H04B 7/0469 370/252 |
| 2014/0301496 A1* | 10/2014 | Ko | H04B 7/0639 375/267 |
| 2014/0327579 A1 | 11/2014 | Hart et al. | |
| 2015/0091757 A1* | 4/2015 | Shaw | H04W 64/006 342/385 |
| 2015/0234033 A1 | 8/2015 | Jamieson et al. | |
| 2016/0033616 A1 | 2/2016 | Sen et al. | |
| 2016/0066137 A1* | 3/2016 | Kulkarni | H04W 4/02 455/456.1 |
| 2016/0142868 A1* | 5/2016 | Kulkarni | H01Q 1/24 455/456.5 |
| 2016/0233935 A1* | 8/2016 | Ko | H04B 7/0639 |
| 2016/0266245 A1* | 9/2016 | Bharadia | G01S 7/038 |
| 2017/0164315 A1* | 6/2017 | Smith | H04W 4/029 |
| 2017/0164318 A1* | 6/2017 | Smith | H04W 4/029 |
| 2017/0180939 A1* | 6/2017 | Kulkarni | H01Q 1/24 |
| 2017/0212204 A1* | 7/2017 | Amizur | G01S 3/14 |
| 2017/0215039 A1* | 7/2017 | Amizur | H04W 4/025 |
| 2017/0227623 A1* | 8/2017 | Park | G01S 3/18 |
| 2017/0328983 A1* | 11/2017 | Volgyesi | G01S 5/0036 |
| 2017/0332192 A1* | 11/2017 | Edge | H04W 64/00 |
| 2017/0366241 A1* | 12/2017 | Ko | H04B 7/0639 |
| 2018/0006689 A1* | 1/2018 | Da Silva | H04B 7/0456 |
| 2018/0011180 A1* | 1/2018 | Warnick | H01Q 3/34 |
| 2018/0184392 A1* | 6/2018 | Prechner | H04W 64/00 |
| 2018/0199252 A1* | 7/2018 | Pawar | H04W 36/08 |
| 2018/0242361 A1* | 8/2018 | Pajovic | H04W 74/0816 |
| 2018/0262867 A1* | 9/2018 | Edge | H04W 64/00 |
| 2018/0262868 A1* | 9/2018 | Edge | H04W 64/00 |
| 2018/0309553 A1* | 10/2018 | Cao | H04L 5/0048 |
| 2018/0310133 A1* | 10/2018 | Ramasamy | H04W 4/025 |
| 2018/0317042 A1* | 11/2018 | Kasher | H04W 64/006 |
| 2019/0033420 A1* | 1/2019 | Knaappila | G01S 3/143 |

OTHER PUBLICATIONS

Balan, et al., "Distributed Multiuser MIMO with Full Spatial Multiplexing," Ming Hsieh Institute, Mar. 12, 2012, pp. 1-2.

Murakami, et al., "Performance Evaluation of Distributed Multi-cell Beamforming for MU-MIMO Systems," 8th International Symposium on Wireless Communication Systems, 2011, pp. 547-551.

Majid, et al., "Parallel implementation of the wideband DOA algorithm on single core, multicore, GPU and IBM cell BE processor," Science Journal of Circuits, Systems and Signal Processing, Apr. 2, 2013, pp. 29-36.

Frikel, et al., "Bearing detection of noised wideband sources for geolocation," IEEE, 18th Mediterranean Conference on Control & Automation (MED), 2010, Jun. 2010, pp. 1650-1653.

(56) References Cited

OTHER PUBLICATIONS

Bourennane, et al., "Wideband Array Processing Using a Partitioned Spectral Matrix," European Association for Signal Processing, EUSIPCO-96, Viii European Signal Processing Conference, Sep. 10-13, 1996, 4 pages.

Michael A. Leabman, "Adaptive Band-Partitioning for Interference Cancellation in Communication Systems", Feb. 1997, Submitted to the Department of Electrical Engineering and Computer Science in Partial Fulfillment of the Requiremens for the Degrees of Bachelor of Science in electrical Science and Engineering and Master of Engineering in Electrical Engineering and Computer Science at the Massachusetts Institute of Technology, 70 pages.

A. Hafiizh et al., "Multiple Subcarrier Indoor Geolocation System in MIMO-OFDM WLAN APs structure", World Academy of Science, Engineering and Technology, International Journal of Mathematical, Computational, Physical, Electrical and Computer Engineering, vol. 3, No. 10, waset.org/Publication/8621, Oct. 2009, 7 pages.

International Search Report and Written Opinion in counterpart International Application No. PCT/US2018/058643, dated Feb. 14, 2019, 10 pages.

\* cited by examiner

```
                                    500
                                    ─
  ┌─────────────────────────────────────────────────────────────────────┐  510
  │ DETECTING AT A PLURALITY OF ANTENNAS OF A WIRELESS DEVICE, ENERGY    │ ╱
  │ SPANNING A FREQUENCY BANDWIDTH THAT MAY INCLUDE A TRANSMISSION FROM  │
  │ EACH OF ONE OR MORE SOURCE DEVICES, WHEREIN A TRANSMISSION FROM A    │
  │ SOURCE DEVICE OCCUPIES A UNIQUE SET OF SUBCARRIERS IN A SUB-BAND OF  │
  │ THE FREQUENCY BANDWIDTH                                              │
  └─────────────────────────────────────────────────────────────────────┘
                                    │
                                    ▼                                      520
  ┌─────────────────────────────────────────────────────────────────────┐ ╱
  │ GENERATING AT LEAST ONE REFERENCE RECEIVE SIGNAL FROM AT LEAST ONE   │
  │ DESIGNATED ANTENNA                                                   │
  └─────────────────────────────────────────────────────────────────────┘
                                    │
                                    ▼                                      530
  ┌─────────────────────────────────────────────────────────────────────┐ ╱
  │ SWITCHING AMONG THE PLURALITY OF ANTENNAS, EXCLUDING THE AT LEAST    │
  │ ONE DESIGNATED ANTENNA, OVER TIME, TO GENERATE A PLURALITY OF        │
  │ ANTENNA-SPECIFIC RECEIVE SIGNALS FOR A CORRESPONDING ANTENNA STATE,  │
  │ EACH FOR A DIFFERENT TIME INTERVAL                                   │
  └─────────────────────────────────────────────────────────────────────┘
                                    │
                                    ▼                                      540
  ┌─────────────────────────────────────────────────────────────────────┐ ╱
  │ COMPUTING A FIRST CHANNEL ESTIMATE BASED ON THE AT LEAST ONE         │
  │ REFERENCE RECEIVE SIGNAL                                             │
  └─────────────────────────────────────────────────────────────────────┘
                                    │
                                    ▼                                      550
  ┌─────────────────────────────────────────────────────────────────────┐ ╱
  │ DECODING AT LEAST A PORTION OF A FRAME FOR ONE OF THE TRANSMISSIONS  │
  │ BASED ON THE FIRST CHANNEL ESTIMATE TO RECOVER SYMBOL DATA           │
  └─────────────────────────────────────────────────────────────────────┘
                                    │
                                    ▼                                      560
  ┌─────────────────────────────────────────────────────────────────────┐ ╱
  │ COMPUTING A SECOND CHANNEL ESTIMATE BASED ON THE PLURALITY OF        │
  │ ANTENNA-SPECIFIC RECEIVE SIGNALS                                     │
  └─────────────────────────────────────────────────────────────────────┘
                                    │
                                    ▼                                      570
  ┌─────────────────────────────────────────────────────────────────────┐ ╱
  │ GENERATING A COMPOSITE CHANNEL ESTIMATE FROM AT LEAST ONE OF THE     │
  │ FIRST CHANNEL ESTIMATE AND THE SECOND CHANNEL ESTIMATE               │
  └─────────────────────────────────────────────────────────────────────┘
                                    │
                                    ▼                                      580
  ┌─────────────────────────────────────────────────────────────────────┐ ╱
  │ USING THE COMPOSITE CHANNEL ESTIMATE, COMPUTING AN ANGLE OF ARRIVAL  │
  │ VECTOR FOR A TRANSMISSION FROM A CORRESPONDING SOURCE DEVICE OF THE  │
  │ ONE OR MORE SOURCE DEVICES                                           │
  └─────────────────────────────────────────────────────────────────────┘
                                    │
                                    ▼                                      590
  ┌─────────────────────────────────────────────────────────────────────┐ ╱
  │ DERIVING A LOCATION ESTIMATE FOR THE CORRESPONDING SOURCE DEVICE OF  │
  │ THE ONE OR MORE SOURCE DEVICES BASED, AT LEAST IN PART, ON THE ANGLE │
  │ OF ARRIVAL VECTOR FOR THE CORRESPONDING SOURCE DEVICE                │
  └─────────────────────────────────────────────────────────────────────┘
```

610 — DETECTING AT A PLURALITY OF ANTENNAS OF A WIRELESS DEVICE, ENERGY SPANNING A FREQUENCY BANDWIDTH THAT MAY INCLUDE A TRANSMISSION FROM EACH OF ONE OR MORE SOURCE DEVICES, WHEREIN A TRANSMISSION FROM A SOURCE DEVICE OCCUPIES A UNIQUE SET OF SUBCARRIERS IN A SUB-BAND OF THE FREQUENCY BANDWIDTH

620 — GENERATING AT LEAST ONE REFERENCE RECEIVE SIGNAL FROM AT LEAST ONE DESIGNATED ANTENNA

630 — SWITCHING AMONG THE PLURALITY OF ANTENNAS, EXCLUDING THE AT LEAST ONE DESIGNATED ANTENNA, OVER TIME, TO GENERATE A PLURALITY OF ANTENNA-SPECIFIC RECEIVE SIGNALS FOR A CORRESPONDING ANTENNA STATE, EACH FOR A DIFFERENT TIME INTERVAL

640 — COMPUTING A FIRST CHANNEL ESTIMATE BASED ON THE AT LEAST ONE REFERENCE RECEIVE SIGNAL

650 — DECODING AT LEAST A PORTION OF A FRAME FOR ONE OF THE TRANSMISSIONS BASED ON THE FIRST CHANNEL ESTIMATE TO RECOVER SYMBOL DATA

660 — FILTERING SAMPLES OF THE PLURALITY OF ANTENNA-SPECIFIC RECEIVE SIGNALS WITH A FILTER BANK THAT SEPARATES ANTENNA-SPECIFIC RECEIVE SIGNALS FOR A CORRESPONDING SOURCE DEVICE OF THE ONE OR MORE SOURCE DEVICES, TO PRODUCE A FILTERED OUTPUT

670 — PERFORMING A CROSS CORRELATION ON THE FILTERED OUTPUT TO GENERATE A PLURALITY OF CROSS CORRELATION OUTPUTS, ONE FOR EACH OF THE PLURALITY OF ANTENNAS, EXCLUDING THE AT LEAST ONE DESIGNATED ANTENNA, TO PRODUCE CROSS CORRELATION OUTPUTS THAT COMPRISE SEPARATE CROSS CORRELATION SAMPLES FOR EACH ANTENNA STATE

675 — STORING THE CROSS CORRELATION SAMPLES MAPPED BY ANTENNA STATE AND FILTER BANK INDEX ASSOCIATED WITH A CORRESPONDING SOURCE DEVICE

680 — CONVERTING THE CROSS CORRELATION OUTPUTS TO AN ANGLE OF ARRIVAL VECTOR FOR EACH SOURCE DEVICE OF THE ONE OR MORE SOURCE DEVICES

690 — DERIVING A LOCATION ESTIMATE FOR THE CORRESPONDING SOURCE DEVICE OF THE ONE OR MORE SOURCE DEVICES BASED, AT LEAST IN PART, ON THE ANGLE OF ARRIVAL VECTOR FOR THE CORRESPONDING SOURCE DEVICE

FIG.8

CHANNEL ESTIMATION IN OFDMA FOR SWITCHED ANTENNA ARRAY BASED ANGLE-OF-ARRIVAL LOCATION

TECHNICAL FIELD

The present disclosure relates to wireless communications.

BACKGROUND

In Angle of Arrival (AoA) or any location technology used to locate wireless device, it is desirable to reduce location error due to signal-to-noise ratio (SNR) and multipath in order to achieve more accurate location results. In AoA-based location techniques, raw data (from channel state information or raw in-phase/quadrature-phase samples) is converted into phase vectors that are supplied as input to the AoA-based location solution. The manner in which the phase vectors are converted and ultimately input into the AoA-based computation can significantly affect accuracy.

Phase estimates at the antennas of a circular or other geometric antenna array are used to estimate the incident direction of radio waves. In 802.11, it is convenient to use the channel estimate from packet reception in estimating this phase. However, using the channel estimate limits scalability since there is only 1 or 2 long training fields (LTFs) per PPDU. Therefore, in order to capture AoA estimates in a system with a switched antenna array, multiple PPDUs need to be sent to capture every antenna state. In order to decrease the number of PPDUs required, switching can occur during the PPDU, but the LTF cannot be the lone source of the channel estimate.

IEEE 802.11ax introduces Orthogonal Frequency Division Multiple Access (OFDMA), where client traffic no longer occupies the entire signal bandwidth. Instead, clients are allocated resource units (RUs) or subsets of the full signal spectrum and transmit or receive at the same time. OFDMA provides a way to vastly increase the scalability of AoA location by capturing the AoA estimate for many clients at the same time. However, obtaining the channel estimate on a per client basis while switching through the states of an antenna array presents challenges.

BRIEF DESCRIPTION OF THE DRAWINGS

FIG. 8 is a flow chart depicting at a high-level the operations performed for generating angle-of-arrival data from uplink OFDMA transmissions using a switched antenna array, according to the third embodiment of FIG. 6.

DESCRIPTION OF EXAMPLE EMBODIMENTS

Overview

In one embodiment, techniques are presented herein for generating angle-of-arrival data at an antenna array of a wireless device in order to derive a location of one or more devices that are a source of a wireless transmission in a frequency band using OFDMA techniques. A wireless device, e.g., a wireless access point (AP), detects at its plurality of antennas, energy spanning a frequency bandwidth that may include a transmission from each of one or more source devices (e.g., clients), wherein a transmission from a source device occupies a unique set of subcarriers in a sub-band of the frequency bandwidth. The wireless device generates at least one reference receive signal from at least one designated antenna. The wireless device switches among the plurality of antennas, excluding the at least one designated antenna, over time, to generate a plurality of antenna-specific receive signals, each for a different time interval. The wireless device computes a first channel estimate based on the at least one reference receive signal, and decodes at least a portion of a frame for one of the transmissions based on the first channel estimate to recover symbol data. The wireless device computes a second channel estimate based on the plurality of antenna-specific receive signals. The wireless device generates a composite channel estimate from at least one of the first channel estimate and the second channel estimate. Using the composite channel estimate, the wireless device computes an angle of arrival vector for a transmission from a corresponding source device of the one or more source devices. The wireless device, or another device (such as a wireless local area network controller or server) derives a location estimate for the corresponding source device of the one or more source devices based on the angle of arrival vector for the corresponding source device.

In another embodiment, the wireless device filters samples of the plurality of antenna-specific receive signals with a filter bank that separates antenna-specific receive signals for a corresponding source device of the one or more source devices, to produce a filtered output. The wireless device performs a cross correlation on the filtered output to generate a plurality of cross correlation outputs, one for each of the plurality of antennas, excluding the at least one designated antenna. The wireless device converts the cross correlation outputs to an angle of arrival vector for each source device of the one or more source devices, and a location estimate for the corresponding source device of the one or more source devices is computed based on the angle of arrival vector for the corresponding source device.

Example Embodiments

The embodiments presented herein provide AoA estimates while switching antenna states during a packet unit for the general OFMDA case (including a single user). A wireless device computes channel estimates throughout the entire frame and not only during the training symbols. Consequently, the wireless device computes channel estimates for all antennas in its array within a single frame instead of having to wait for multiple frames.

In some wireless communication/wireless network systems, such as an IEEE 802.11ax system, Orthogonal Frequency Division Multiple Access (OFDMA) techniques are used to enable multiple wireless clients to transmit at the same time on different slices of frequency (subcarriers) in as small as 2 MHz. For example, in IEEE 802.11ax, there could be as many as 9 wireless clients simultaneously transmitting on a 20 MHz channel to an access point.

It is desirable to leverage OFDMA and any other techniques now known or hereinafter developed in order to simultaneously locate as many clients as possible. To this end, the phase information at each of a plurality of antenna elements at the access point is determined for each client's transmission as switching is made through all of the antenna states of the antenna array of the access point as a frame is received simultaneously from a plurality of clients. The access point cycles through antenna states as the frames from the multiple wireless clients are received, and the full angle vector that represents all antennas states is constructed for each client individually. This can be achieved in the time domain or the frequency domain. Moreover, training fields in the transmissions received from the clients may not be available at any given time on a given antenna due to the switching made through the antenna elements and the asynchronous nature of the client transmissions.

Figure 1:
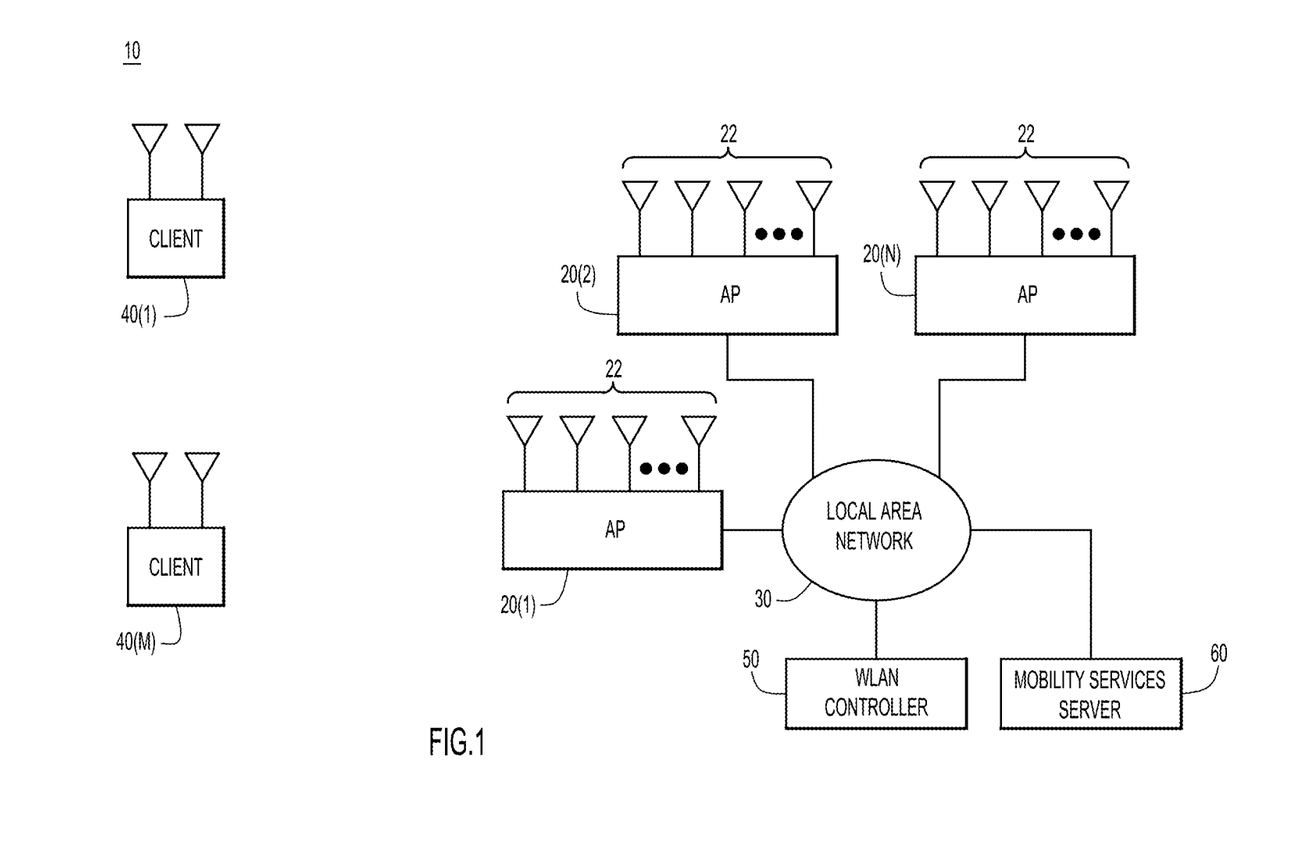
FIG. 1 is a block diagram of a wireless network environment in which one or more wireless access points are configured to generate angle-of-arrival information for individual client devices transmitting uplink transmissions using OFDMA techniques, according to an example embodiment.

Reference is first made to FIG. 1. FIG. 1 shows a network environment 10 that supports a wireless network capability, such as a Wi-Fi® wireless local area network (WLAN). There are multiple wireless access points (APs), shown at reference numerals 20(1)-20(N). The APs support WLAN connectivity for multiple wireless client devices (also called "clients" herein) shown at reference numerals 40(1)-40(M). It should be understood that FIG. 1 is only a simplified example. There may be numerous more clients in a real network deployment. Moreover, for some applications, there may be only a single AP in a deployment. Each of the APs 20(1)-20(N) has a plurality of antennas or an array or antenna elements, shown collectively at reference numeral 22. The number of antennas at each AP may vary. In one example, there are 4, 8, 16 or 32 antenna elements at each AP.

There is back-end infrastructure that is used for control and other functions of the WLAN. Specifically, the APs 20(1) and 20(2) connect to a wired local area network 30 to which are also connected a WLAN controller 50 and a mobility services server 60. The WLAN controller 50 performs control functions for the APs 20(1)-20(N) and clients 40(1)-40(M). In addition, the mobility services server 60 performs, among other things, location functions to track the locations of clients based on data gathered from signals received at one or more APs (or at other wireless devices at fixed locations). The WLAN controller 50 and mobility services server 60 may reside on the same physical apparatus, or may be applications running on a data center. Thus, both the WLAN controller 50 and mobility services server 60 are not required in order to performance the techniques presented herein.

Figure 2:
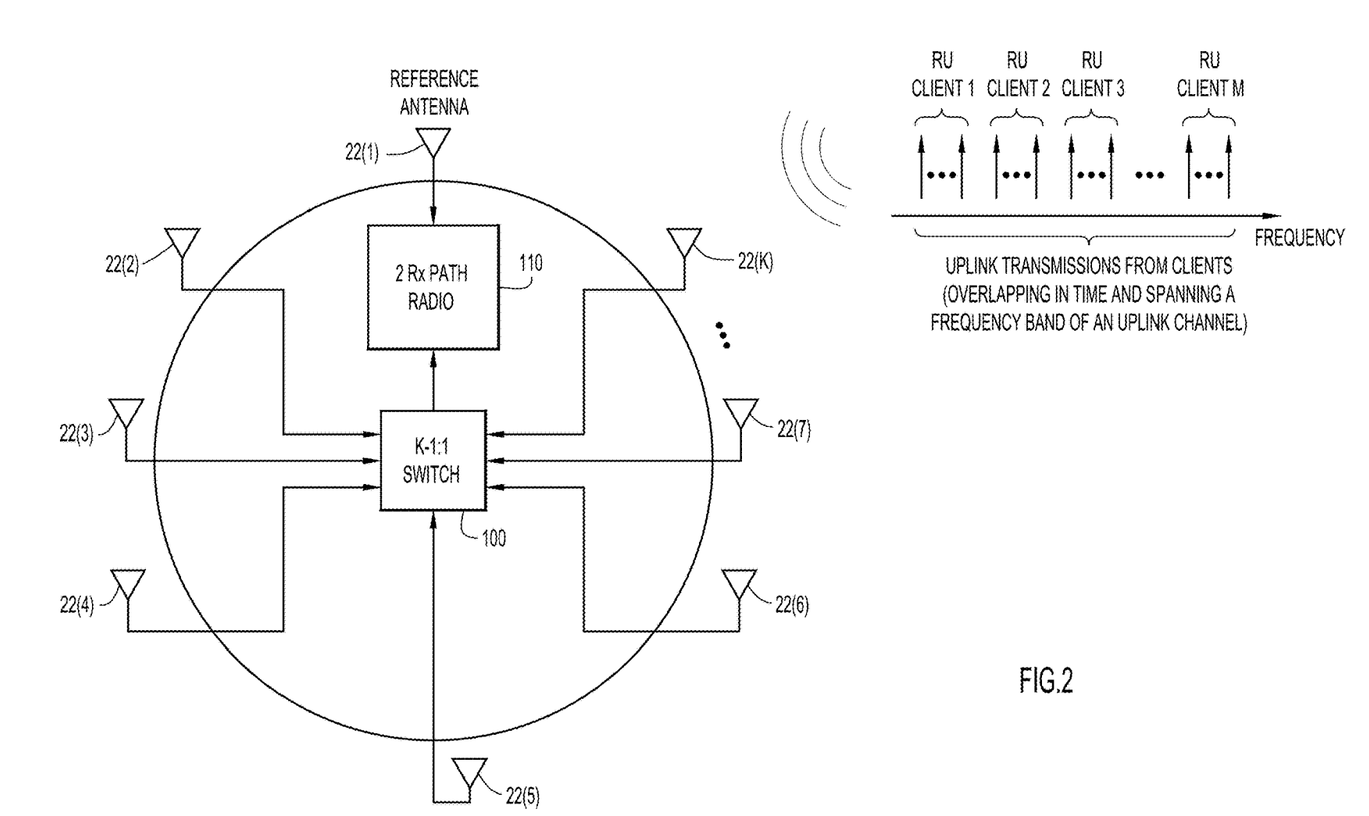
FIG. 2 is a diagram showing a switched antenna array employed at a wireless access point to generate receive signals at a reference antenna and a plurality of switched antennas, according to an example embodiment.

The APs 20(1)-20(N) may employ a switched antenna array. FIG. 2 shows an example of switched antenna array comprised of antenna elements 22(1)-22(K), a K-1:1 switch 100 and a 2 receiver (Rx) path radio 110. This K-element circular array has a single reference antenna, arbitrarily antenna 22(1) in this example, and K-1 switched antenna elements 22(2)-22(K). The signal detected by the signal reference antenna 22(1) is fed to one receiver path of the radio 110 and the switch 100 selects a different one of the antennas 22(2)-22(K) at different points in time (for each data symbol, for example. In an even more general case, there could be any number of reference paths and switched paths to handle more spatial stream decoding and/or reduce the number of required antenna states. For example, the radio 110 could have P receiver paths (P>=2), with Z paths used as a reference (Z>=1) and connected directly to the radio 110, and L paths coupled to the radio via the switch 110, where L>=1.

FIG. 2 shows that uplink transmissions from clients are assigned Resource Units (RUs) each consisting of a predetermined number of subcarriers within a relatively small sub-band bandwidth, e.g., 2 MHz. Clients are assigned/allocated different RUs, as shown in FIG. 2, but the allocation shown in the figure is only example. The allocation need not be in the order shown. A plurality of RUs across one or more clients (or in general M clients) spans a frequency band of an uplink channel. The individual client uplink transmissions may occur at any time, and thus they may partially or completely overlap in time since they do not overlap in frequency.

Using a switched antenna array as shown in FIG. 2 presents challenges in distinguishing the received subcarriers from a particular client/RU, in order to obtain the AoA estimate for a corresponding client. Presented herein are methods to obtain AoA estimates using switched antenna arrays for OFDMA. A reference path is used for both AoA estimation and decoding the frame in order obtain a media access control (MAC) address and other identifier information from the frame.

Figure 3:
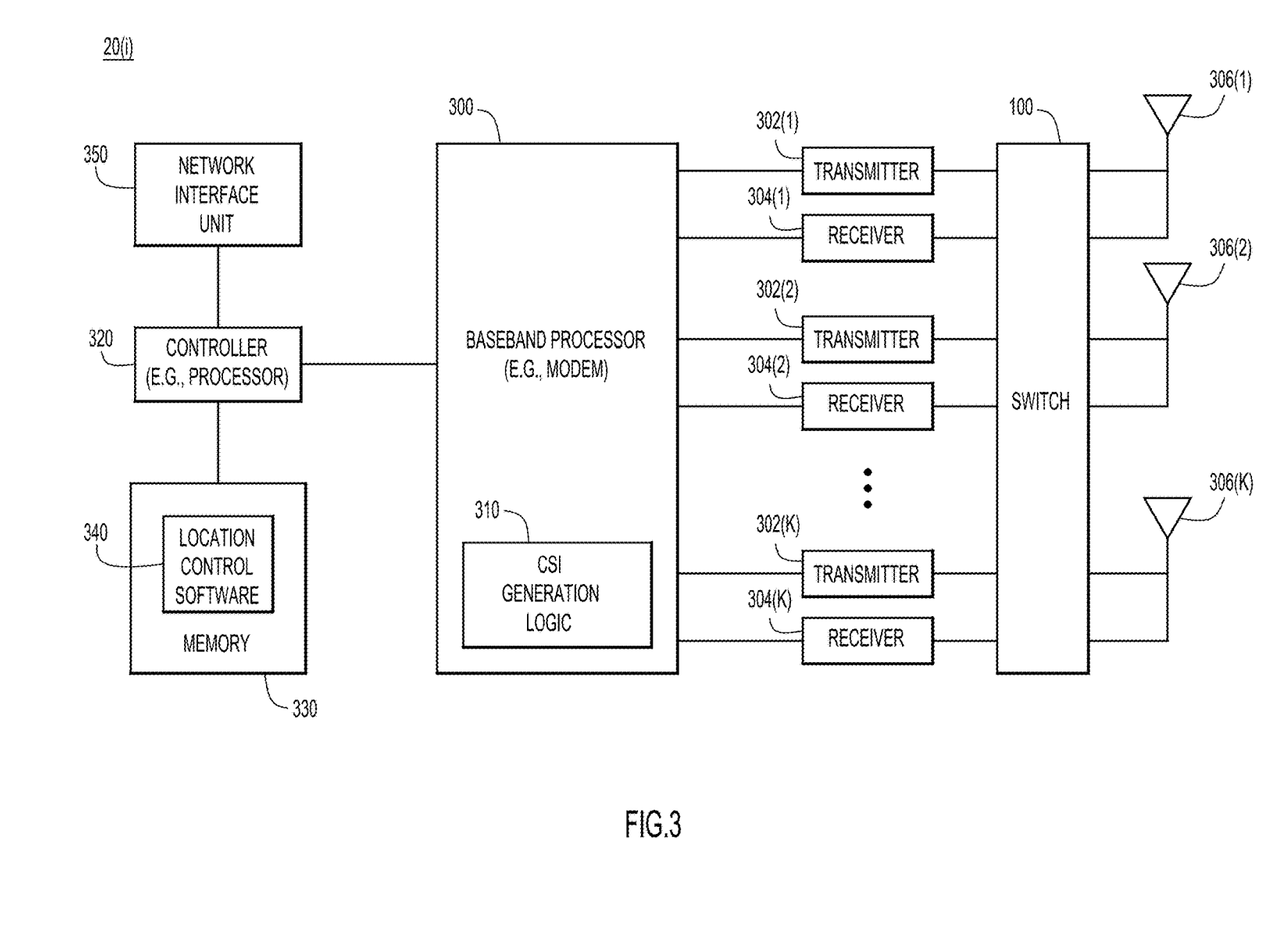
FIG. 3 is a block diagram of a wireless access point device configured to generate angle-of-arrival data from uplink OFDMA transmissions using a switched antenna array, according to an example embodiment.

Reference is now made to FIG. 3 that shows a block diagram of a wireless device, e.g., an AP, which is capable of performing operations related to the embodiments presented herein. The AP shown in FIG. 3 is identified generally by reference numeral 20(i) and is representative of any of the APs shown in FIG. 1.

The AP 20(i) includes a baseband processor (e.g., modem) 300, a plurality of transmitters 302(1)-302(K), a plurality of receivers 304(1)-304(K), a plurality of antennas 306(1)-306(K), a controller 320 and a memory 330. The plurality of transmitters 302(1)-302(K) and plurality of receivers 304(1)-304(K) may be integrated as part of a radio, e.g., the radio 110 shown in FIG. 2. Each transmitter 302(1)-302(K) is connected to a corresponding one of the plurality of antennas 306(1)-306(K). Receivers 304(1)-304(K) are connected to a select one of the plurality of antennas 306(1)-306(K) via switch 100 as depicted in more detail in FIG. 2. It should be understood that the functions of the switch 100 could also be performed between the baseband processor 30 and the plurality of receivers 304(1)-304(K). The baseband processor 300 includes channel state information/estimation (CSI) generation logic 310 that is used to send generate CSI from received signals at the antennas 306(1)-306(K), and to partition that CSI into subcarrier groups as shown and described above. The baseband processor 300 includes logic needed for FFT and other related computations made based on reception of an OFDM signal that comprises a plurality of subcarriers that span a frequency bandwidth of a received transmission. Operations of the CSI generation logic 310 in accordance with various embodiments are described below with respect to FIGS. 4-6.

The baseband processor 300 may be implemented by fixed or programmable digital logic gates, such as in the form of an application specific integrated circuit (ASIC), or may be implemented by a dedicated digital signal processor, microprocessor or microcontroller. The CSI generation logic 310 is only one of several functional blocks of the baseband processor 300, and again, it may be implemented by digital logic gates or by instructions executed by a microprocessor.

The controller 320 is coupled to the baseband processor 300 and provides higher level control for the AP 20(i). The controller 320 may be a microprocessor or microcontroller. The memory 330 stores instructions that the controller 320 executes to perform the control functions of the AP 20(i). Among these functions are operations performed when the controller 320 executes the location control software 340 stored in memory 330.

The memory 330 may comprise read only memory (ROM), random access memory (RAM), magnetic disk storage media devices, optical storage media devices, flash memory devices, electrical, optical, or other physical/tangible memory storage devices. Thus, in general, the memory 330 may comprise one or more tangible (non-transitory) computer readable storage media (e.g., a memory device) encoded with software comprising computer executable instructions and when the software is executed (by the controller 320) it is operable to perform the operations described herein. Moreover, the functions of the CSI generation logic 310 may take the form of software stored in memory 330 and executed by the controller 320.

The AP 20(i) further includes a network interface unit 350, e.g., an Ethernet card, which enables the AP 20(i) to communicate over a wired network. The network interface unit 350 thus enables the AP 20(i) to receive commands from the WLAN controller 50 or mobility services server 60, and to send data, such as channel state information data or subcarrier group specific data for each of a plurality of groups of subcarriers.

Presented herein are three methods to obtain AoA estimates using switched antenna arrays for OFDMA. In all cases, a reference path is used for both AoA estimation and decoding the frame in order obtain a media access control (MAC) address and other identifier information from the frame.

Figure 4:
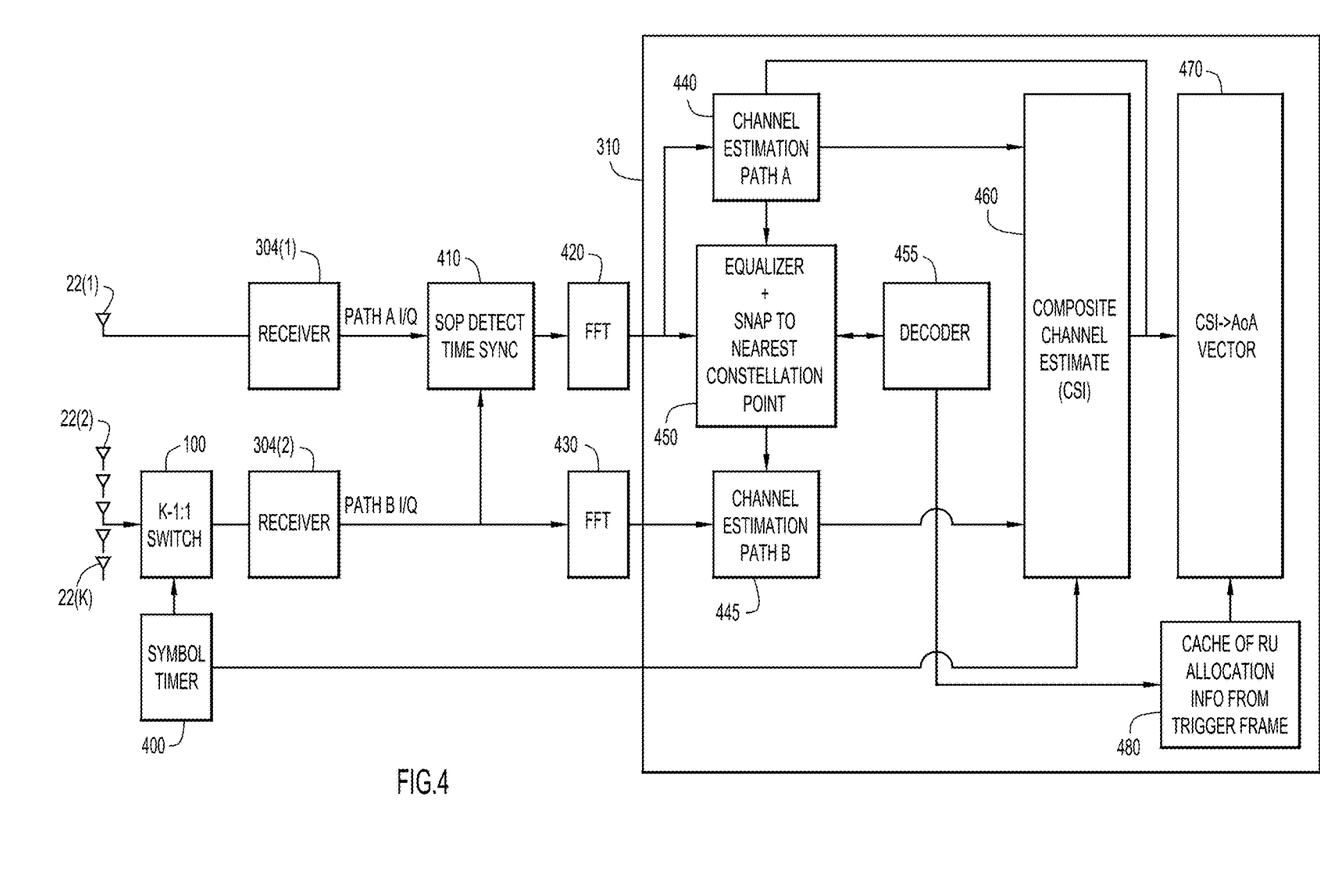
FIG. 4 is a functional block diagram of signal processing performed to generate angle-of-arrival data from uplink OFDMA transmissions using a switched antenna array, according to a first example embodiment.
Figure 5:
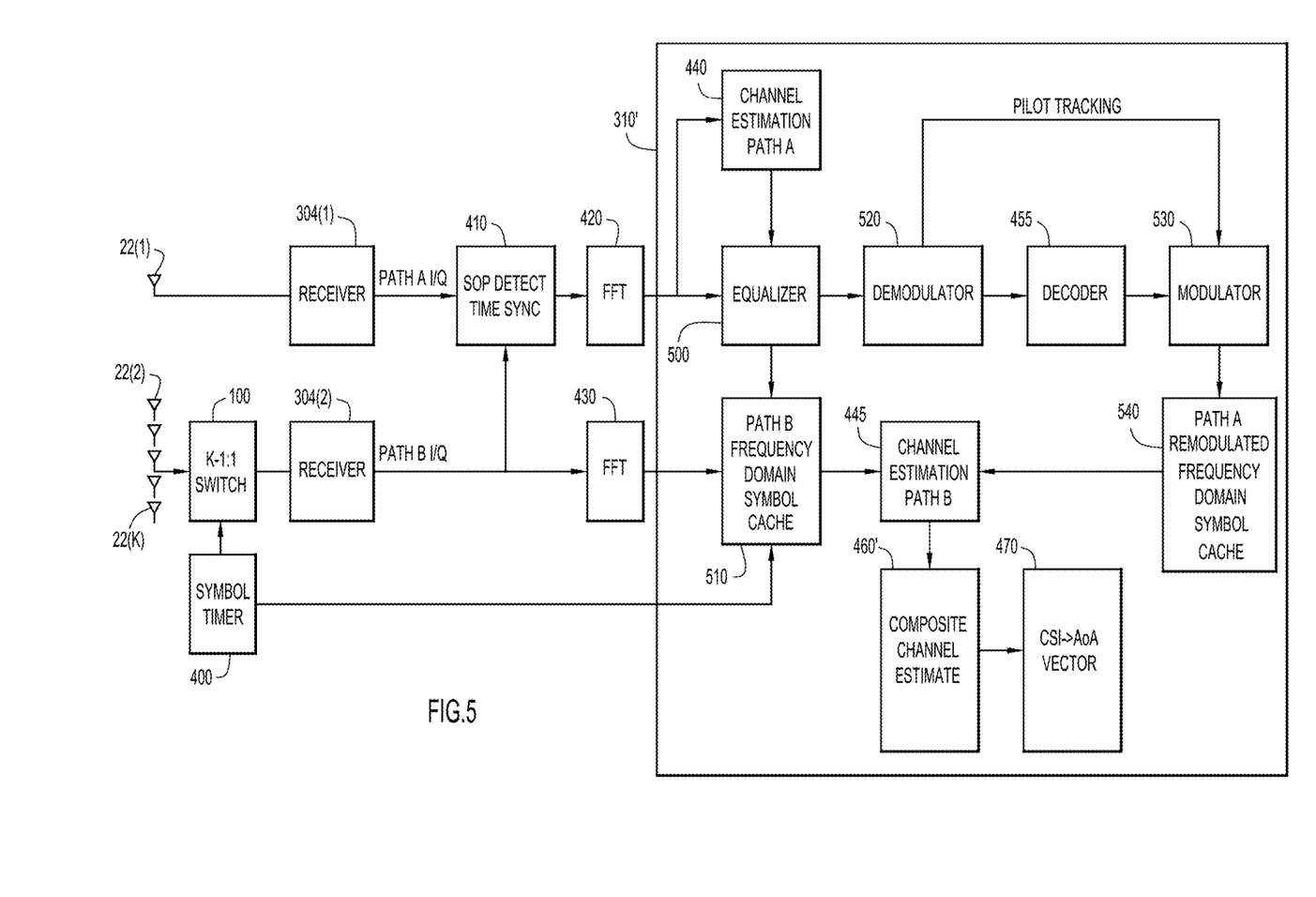
FIG. 5 is a functional block diagram of signal processing performed to generate angle-of-arrival data from uplink OFDMA transmissions using a switched antenna array, according to a second example embodiment.

For the embodiments shown in FIGS. 4 and 5, any OFDM symbol can be used to train the channel estimate as long as it can be determined what that symbol is encoded to be. That knowledge need not be obtained by a training field of the frame, such as a known long training field (LTF) in a Wi-Fi frame. The reference path is used to determine each symbol. The solutions depicted in FIGS. 4 and 5 are less computationally complex but also less robust against errors on the reference path.

Figure 6:
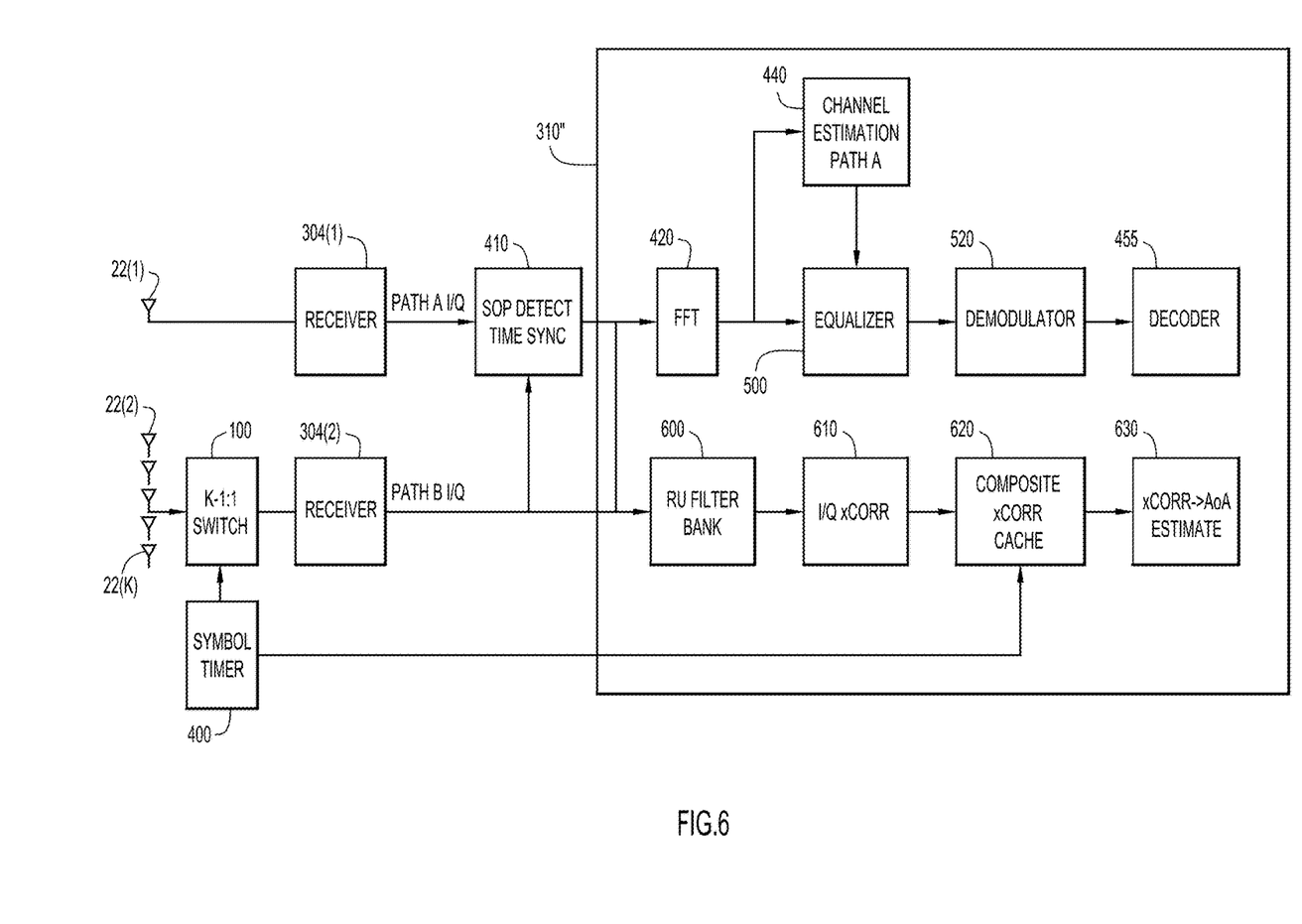
FIG. 6 is a functional block diagram of signal processing performed to generate angle-of-arrival data from uplink OFDMA transmissions using a switched antenna array, according to a third example embodiment.

The embodiment shown in FIG. 6 is somewhat different. Instead of obtaining channel estimates, the embodiment operates on raw time domain in-phase (I) and quadrature (Q) samples and a cross correlator to obtain the AoA estimate. A filter bank is used to isolate the OFDMA RUs per user.

The embodiments depicted in FIGS. 4-6 may be implemented on a software defined radio (SDR) where access to the raw baseband I/Q samples is common. However, these embodiments may also be implemented in hardware, or a combination of hardware and software.

For purposes of the descriptions below, an AoA vector A is determined by the computation $A=\text{angle}(\text{conj}(H^{ref})*H^T)$. Channel Estimation Scheme Based on Equalized Symbols of a Reference Path Reference is now made to FIG. 4 for a description of an embodiment that involves operations performed in the frequency domain. FIG. 4 shows antenna 22(1) is used as the reference antenna and is connected to receiver 304(1) to produce a receive signal on Path A. The K-1:1 switch 100 selects one of the antennas 22(2)-22(K) for connection to receiver 304(2) produce a receive signal on Path B. Control of the K-1:1 switch is made by way of a symbol timer function 400. The receiver 304(1) downconverts the signal detected by antenna 22(1) to produce Path A I and Q samples (after they are converted by an analog-to-digital (ADC) converter, not shown for simplicity). Receiver 304(2) downconverts the signal detected a selected one of the antennas 22(2)-22(K) to produce Path B I and Q samples.

A start-of-packet (SOP) detect time synchronization (sync) function 410 receives the Path A I and Q samples and Path B I and Q samples. The output of the SOP detect time sync function 410 is coupled to a Fast Fourier Transform (FFT) function 420 and similarly the Path B I and Q samples are coupled to a FFT function 430.

In the embodiment of FIG. 4, the CSI generation logic 310 includes a Channel estimation Path A function 440, a channel estimation Path B function 445, and equalizer and snap to nearest constellation point function 450, a decoder 455, a composite CSI function 460, and a CSI-to-AoA vector function 470. In addition, a cache 480 of RU allocation information from a trigger frame is provided. The channel estimation Path A function receives as input the output of the FFT 420 and an output of the composite CSI function 460 and generates an output supplied to the equalizer and snap function 450 and to the composite CSI cache function 460. The equalizer and snap function 450 supplies an output to the channel estimation Path B function 445 based on cooperation with the decoder function 455. The composite CSI function 460 receives as input the outputs of the channel estimation Path A function 440 and channel estimation Path B function 445, as is also under control of the symbol timer 400. The composite CSI cache function 460 generates a composite CSI that is supplied as input to the CSI-to-AoA vector function 470. The CSI-to-AoA vector function 470 generates an AoA vector for a given RU based on information stored in the cache 480.

Operation of the embodiment of FIG. 4 is now described. Again, because there is switching among the antenna paths for one of receive paths while packets are being received, the challenge is how to generate a channel estimate from the rest of the data portion of the frame. The FFT function 420 computes an FFT for any given symbol for which a switch is made to a new antenna element. It is assumed that a symbol is supposed to be some known modulation scheme. The equalizer and snap function 450 "snaps" the resolved point to a nearest constellation point for a known modulation scheme, and that is used as a reference to obtain the channel estimate. Any single symbol could act as a training field if it is known what that symbol is supposed to be. The channel estimate obtained from a training field or symbol is used to correct the raw FFT output, and snap that FFT output to a constellation point for whatever constellation it is supposed to be. That constellation point is the reference (a transmitted signal that is expected), and that reference is used to obtain a channel estimate. Thus, the scheme depicted in FIG. 4 uses the equalized/snapped/modulated/encoded symbol from the reference path (Path A) as known values for purposes of computing the channel estimate for the switched path (Path B).

More specifically, first, the SOP detect time sync block 410 looks for a start-of-packet and the channel estimation Path A function 440 generates the channel estimate for the reference path, Path A, using a training field included in the packet. The channel estimate for Path A is saved for later decoding of the frame with the reference path as in normal 802.11/Wi-Fi receive processing. The channel estimate for Path A is also used by the equalizer and snap function 450 to equalize the output of the FFT for Path A in order to determine the training values for a symbol.

The equalizer and snap function 450 equalizes the output of the FFT 420 and snaps it to the nearest constellation point based on the known modulation coding scheme from the decoding of the SIG field, for example, by the decoder 455. The equalized/snapped values generated by the equalizer and snap function 450 are supplied to the channel estimation Path B function 445 to generate the channel estimate for Path B during any symbol. The symbol timer 400 is used to control the physical antenna switching as well as to route the output of the Path B switched antenna channel estimate into a corresponding index in the composite channel estimate cache function 460.

After a channel estimation is obtained for full set of antennas (antennas 22(2)-22(K)), the CSI for any particular user is converted to a phase estimate. The cache 480 saves the mapping of the clients to the subcarriers allocation (i.e., RU's) from the trigger frame. The CSI to AoA vector function 470 takes into consideration the signal-to-noise (SNR) of each subcarrier of the reference Path A channel estimate in order to limit the impact of poor SNR from the reference path on the channel estimates of the switched path. Using data derived from the trigger frame stored in the cache 480, the AoA vectors computed for the various RU's may be mapped to actual client MAC addresses or to other client identifier information.

Channel Estimation Scheme Based on Decoded and Re-Modulated Symbols of a Reference Path Reference is now made to FIG. 5. FIG. 5 illustrates the functional blocks of CSI generation logic 310' that performs a channel estimation scheme that is similar to that shown in FIG. 4, but without snapping to constellation point. Instead, the entire frame is decoded to provide a more robust reference to generate the channel estimate after re-modulation. Instead of comparing to what is received on Path A, bit errors on Path A are determined to generate what Path A (idealized) should be, and that is used for a channel estimate by comparing to Path B. This scheme is more computationally intensive than that of FIG. 4, but it is potentially more robust/accurate.

Several functional blocks from the scheme depicted in FIG. 4 are also present in the scheme of FIG. 5, including the channel estimation Path A function 440, channel estimation Path B function 445, the decoder 455, the composite channel estimation function 460' (which is slightly different than the function 460 in FIG. 4) and the CSI-to-AoA estimation function 470. The equalizer 500 is coupled to the output of the FFT 420 for Path A and to the channel estimation Path A function 440, and performs an equalization function. The output of the FFT 430 for Path B is coupled to a Path B frequency domain symbol cache 510. A demodulator function 520 is coupled to the output of the equalizer function 500. The decoder 455 is coupled to the output of the demodulator 520, and a modulator function 530 is coupled to the output of the decoder 455. Pilot tracking is performed between the demodulator 520 and modulator 530. A Path A remodulated frequency domain symbol cache 540 is coupled to the output of the modulator 540. The output of the Path A remodulated frequency domain symbol cache 540 is coupled to the channel estimation Path B function 445. The composite channel estimate function 460' is coupled to the output of the channel estimation Path B function 445, and the output of the composite channel estimate function 460 is coupled to the CSI-to-AoA estimation function 470.

This CSI estimation logic 310' operations similar to the CSI estimation logic 310 of FIG. 4, except for the additional steps operations to decode and remodulate the equalized FFT output. This adds robustness to the reference path input to the channel estimate of the switched paths by fully decoding path A and remodulating to map that decoded data to each symbol.

Specifically, the channel estimation Path A function 440 computes a channel estimation of Path A based on the output of the FFT 420 and supplies that estimate to the equalizer 500. The equalizer 500 also receives as input the output of the FFT 420 and produces an equalized Path A output that is supplied to the demodulator 520. The demodulator 520 demodulates the equalized Path A output to produce demodulated Path A data that is supplied to the decoder 455. The decoder 455 decodes the demodulated Path A data to produce decoded symbol data for an entire packet/frame. The modulator 530 remodulates the decoded symbol data (in the frequency domain) and is saved to the Path A remodulated frequency domain symbol cache 540. The channel estimation Path B function 445 operations on the output of the FFT 430 for Path B and the demodulated frequency domain symbol from cache 540 to output a channel estimate for Path B to the composite channel estimate function 460'. The composite channel estimate function 460' operates only on the channel estimate for Path B, unlike the composite channel estimate function 460 which operates on the channel estimate for Path A and the channel estimate for Path B. The CSI-to-AoA estimate function 470 generates an AoA estimate using the composite CSI estimate output by the composite channel estimate function 460'.

In the scheme depicted in FIG. 5, some operations would not be real-time processing, but instead involving saving FFT outputs for each symbol of the switched path, Path B, and later performing channel estimation after decoding and remodulation of the decoded bits in Path A.

AoA Estimate Based on Cross-Correlation of a Filter Bank Output

FIG. 6 illustrates another form of the CSI generation logic 310". The CSI generation logic 310" shares some functions of the CSI generation logic 310', including the FFT 410 for Path A, channel estimation for Path A function 440, equalizer 500, demodulator 520, and decoder 455. The different/new functions of the CSI generation logic 310" are the RU filter bank 600, I/Q cross correlator (xCorr) function 610, composite xCorr cache 620 and xCorr-to-AoA estimation function 630. Path A is used to decode a frame, and the operations of the FFT 420, channel estimation Path A function 440, equalizer 500, demodulator 520 and decoder 455 are similar to that described above in connection with FIG. 5, except the coupling between Path A and Path B is at the output of the SOP detect time sync function 410. The output of the decoder 455 is the decoded symbol bits, and it is used to recover data from the packet, such as MAC address and other information, but is not fed back and used in Path B channel estimation.

As shown in FIG. 6, the output of the SOP detect time sync function 410 is supplied as input to the FFT 420 and to the RU filter bank 600 to filter/separate the I/Q samples for any given RU. The output of the filter bank 600 is supplied to the I/Q xCorr function 610 to generate a cross correlation output for each of the antenna states, which is stored in the composite xCorr cache 620. In other words, the I/Q xCorr function 610 cross correlates the output of the RU filter bank 600 for the reference path (Path A) with the switched path IQ samples (for Path B) for each antenna state. The cross correlation output for each antenna state consists of separate xCorr samples for each antenna state and these samples are mapped in the composite xCorr cache based on the antenna state and RU filter bank index. The xCorr to AoA estimate function 630 converts the cross correlation outputs to an AoA vector, stitching the RUs together based on decoding of the trigger frame and knowledge of the RU allocation, or computing the AoA vector for each discrete 2 MHz subcarrier sub-band.

Figure 7:
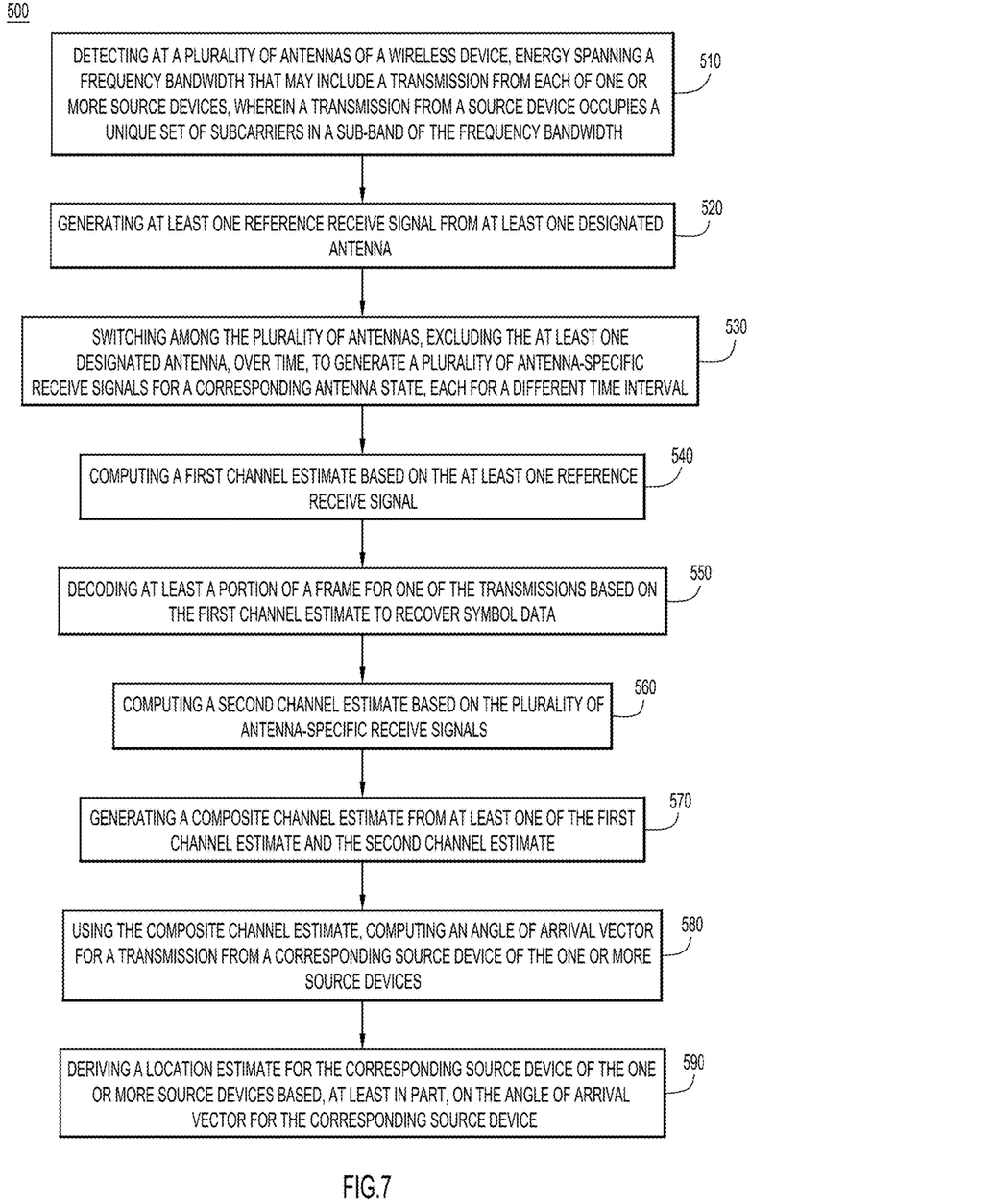
FIG. 7 is a flow chart depicting at a high-level the operations performed for generating angle-of-arrival data from uplink OFDMA transmissions using a switched antenna array, according to the first and second example embodiments of FIGS. 4 and 5.

Reference is now made to FIG. 7. FIG. 7 illustrates a flow chart that depicts, at a high-level, a method 500 represented by FIGS. 4 and 5 to obtain AoA estimates for each client device that is a source of a transmission of an RU in an OFDMA scheme described herein. At 510, at least one wireless device, e.g., an AP, detects at its plurality of antennas, energy spanning a frequency bandwidth that may include a transmission from each of one or more source devices (e.g., clients), wherein a transmission from a source device occupies a unique set of subcarriers in a sub-band of the frequency bandwidth. At 520, the wireless device generates at least one reference receive signal from at least one designated antenna. At 530, the wireless device switches among the plurality of antennas, excluding the at least one designated antenna, over time, to generate a plurality of antenna-specific receive signals for a corresponding antenna state, each for a different time interval. At 540, the wireless device computes a first channel estimate based on the at least one reference receive signal. At 550, the wireless device decodes at least a portion of a frame for one of the transmissions based on the first channel estimate to recover symbol data. At 560, the wireless device computes a second channel estimate based on the plurality of antenna-specific receive signals. At 570, the wireless device generates a composite channel estimate from at least one of the first channel estimate and the second channel estimate. At 580, using the composite channel estimate, the wireless device computes an angle of arrival vector for a transmission from a corresponding source device of the one or more source devices. At 590, the wireless device, or another device (such as a WLAN controller or mobile services server) derives a location estimate for the corresponding source device of the one or more source devices based, at least in part, on the angle of arrival vector for the corresponding source device. It should be understood that the location estimate computed in operation 590 may also employ information derived from other location technologies or data, such as received signal strength indicator (RSSI) information, differential time of arrival (DToA), etc. Thus, the location derived for a corresponding source device may be derived, at least in part, on the angle of arrival vector computed for the corresponding source device.

The method 500 may further include equalizing the first channel estimate to produce an equalized first channel estimate, and wherein the decoding operation 550 is based on the equalized first channel estimate. Furthermore, the method 500 may further include determining (i.e., "snapping"), for the symbol data, a nearest constellation point of a modulation scheme. In this case, the operation 560 of computing the second channel estimate uses the nearest constellation point of the modulation scheme as known values when computing the second channel estimate from the plurality of antenna-specific receive signals. Further still, the method 500 may further include based on the decoding operation 550, storing resource unit information describing allocation of a sub-band to a corresponding one of the one or more source devices; and wherein the operation 580 of computing the angle of arrival vector is based on the resource unit information.

Moreover, the method 500 may further include performing start-of-packet detection and synchronization based at least on the at least one reference receive signal, such that the operation 540 of computing the first channel estimate is based on a training data included in a detected packet or frame.

As depicted in FIG. 5, the method 500 may further include operations of: equalizing the first channel estimate to produce an equalized first channel estimate; demodulating the equalized first channel estimate to produce demodulated data, wherein decoding includes decoding the demodulated data for an entire frame; modulating the demodulated data to produce reference remodulated frequency domain symbols; and storing the reference remodulated frequency domain symbols. In this case, the operation 560 of computing the second channel estimate is based on frequency domain symbols derived from a frequency domain transform performed on the plurality of antenna-specific receive signals and based on the reference remodulated frequency domain symbols. Furthermore, the composite channel estimate computed at 580 is computed based on the second channel estimate.

Furthermore, the operation 580 may involve computing a plurality of angle of arrival vectors, one for each of a plurality of sub-bands, each of which is associated with a corresponding one of a plurality of source devices. In this case, using stored data derived from a received trigger frame, the wireless device may map respective ones of the angle of arrival vectors computed for the plurality of sub-bands to an address or identifier information for respective ones of the plurality of source devices.

Turning now to FIG. 8, a flow chart is shown for a method 600 at high-level for the embodiment depicted in FIG. 6. Operations 610-650 are similar to operations 510-550 of method 500 shown in FIG. 7. At 660, the wireless device (e.g., AP) filters samples of the plurality of antenna-specific receive signals with a filter bank that separates antenna-specific receive signals for a corresponding source device of the one or more source devices, to produce a filtered output. At 670, the wireless device performs a cross correlation on the filtered output to generate a plurality of cross correlation outputs, one for each of the plurality of antennas, excluding the at least one designated antenna. The cross correlation outputs comprise separate cross correlation samples for each antenna state. At 675, wireless device stores the cross correlation samples mapped by antenna state and filter bank index associated with a corresponding source device. At 680, the wireless device converts the cross correlation outputs to an AoA vector for each source device of the one or more source devices. At 690, the wireless device (or another device, such as a WLAN controller or a mobility services server) derives a location estimate for the corresponding source device of the one or more source devices based, at least in part, on the angle of arrival vector for the corresponding source device.

The operation 680 of converting the cross correlation outputs to an angle of arrival vector for each source device of the one or more source devices may be based on allocation of the sub-bands to each of the one or more source devices. The method 600 may further include equalizing the first channel estimate to produce an equalized first channel estimate; demodulating the equalized first channel estimate to produce demodulated data; and wherein the decoding operation 650 is based on the demodulated data.

It some embodiments, the computations performed at operations 540-590 of method 500 and at operations 640-690 of method 600 may be performed at a different device, such as a WLAN controller or mobility services server (as depicted in FIG. 1) based on the baseband receive signal samples generated at the AP.

In the embodiments presented above, the antenna used for the reference path and the switched antennas may reside on different wireless devices. For example, the at least one designated antenna (used for the reference path) may reside on a first wireless device, and the plurality of antennas, excluding the at least one designated antenna, may reside on a second wireless device. For example, an access point may save I/Q sample data from Path B into local memory for use after reference data for Path A is provided. Therefore, an access point without sufficient signal-to-interference-plus-noise (SINR) to decode a signal could still provide AoA data.

In still another variation, Path A is one or more antenna paths. Each Path B symbol is cross correlated to each spatial stream, and AoA measurements are generated for any symbol with a correlation above some threshold. Further still, the demodulated data could be used as if it was from N antennas, and the array is used to calculate channel state information for antenna N+1.

To summarize, in one form, a method is provided comprising: detecting at a plurality of antennas of at least one wireless device, energy spanning a frequency bandwidth that may include a transmission from each of one or more source devices, wherein a transmission from a source device occupies a unique set of subcarriers in a sub-band of the frequency bandwidth; generating at least one reference receive signal from at least one designated antenna; switching among the plurality of antennas, excluding the at least one designated antenna, over time, to generate a plurality of antenna-specific receive signals for a corresponding antenna state, each for a different time interval; computing a first channel estimate based on the at least one reference receive signal; decoding at least a portion of a frame for one of the transmissions based on the first channel estimate to recover symbol data; computing a second channel estimate based on the plurality of antenna-specific receive signals; generating a composite channel estimate from at least one of the first channel estimate and the second channel estimate; using the composite channel estimate, computing an angle of arrival vector for a transmission from a corresponding source device of the one or more source devices; and deriving a location estimate for the corresponding source device of the one or more source devices based at least in part on the angle of arrival vector for the corresponding source device.

In another form, one or more non-transitory computer readable storage media are provided that are encoded with instructions, that when executed by a processor (or a wireless communication device), cause the processor to: cause detection at a plurality of antennas of at least one wireless device, of energy spanning a frequency bandwidth that may include a transmission from each of one or more source devices, wherein a transmission from a source device occupies a unique set of subcarriers in a sub-band of the frequency bandwidth; generate at least one reference receive signal from at least one designated antenna; switch among the plurality of antennas, excluding the at least one designated antenna, over time, to generate a plurality of antenna-specific receive signals for a corresponding antenna state, each for a different time interval; compute a first channel estimate based on the at least one reference receive signal; decode at least a portion of a frame for one of the transmissions based on the first channel estimate to recover symbol data; compute a second channel estimate based on the plurality of antenna-specific receive signals; generate a composite channel estimate from at least one of the first channel estimate and the second channel estimate; using the composite channel estimate, compute an angle of arrival vector for a transmission from a corresponding source device of the one or more source devices; and derive a location estimate for the corresponding source device of the one or more source devices based at least in part on the angle of arrival vector for the corresponding source device.

In another form, an apparatus is provided comprising: a plurality of antennas configured to detect wireless transmissions spanning a frequency bandwidth that may include a transmission from each of one or more source devices, wherein a transmission from a source device occupies a unique set of subcarriers in a sub-band of the frequency bandwidth; a first radio receiver coupled to a first antenna of the plurality of antennas, the first radio receiver configured to generate at reference receive signal; a second radio receiver; a switch coupled to the plurality of antennas excluding the first antenna, and to the second radio receiver, the switch configured to switch over time among the plurality of antennas excluding the first antenna to connect one of the plurality of antennas, excluding the first antenna, to the second radio receiver to generate a plurality of antenna-specific receive signals for a corresponding antenna state, each for a different time interval; a processor coupled to the first radio receiver and the second radio receiver, wherein the processor is configured to: compute a first channel estimate based on the at least one reference receive signal; decode at least a portion of a frame for one of the transmissions based on the first channel estimate to recover symbol data; compute a second channel estimate based on the plurality of antenna-specific receive signals; generate a composite channel estimate from at least one of the first channel estimate and the second channel estimate; using the composite channel estimate, compute an angle of arrival vector for a transmission from a corresponding source device of the one or more source devices; and derive a location estimate for the corresponding source device of the one or more source devices based at least in part on the angle of arrival vector for the corresponding source device.

In another embodiment, a method is provided comprising: detecting at a plurality of antennas of at least one wireless device, energy spanning a frequency bandwidth that may include a transmission from each of one or more source devices, wherein a transmission from a source device occupies a unique set of subcarriers in a sub-band of the frequency bandwidth; generating at least one reference receive signal from at least one designated antenna; switching among the plurality of antennas, excluding the at least one designated antenna, over time, to generate a plurality of antenna-specific receive signals for a corresponding antenna state, each for a different time interval; computing a first channel estimate based on the at least one reference receive signal; decoding at least a portion of a frame for one of the transmissions based on the first channel estimate to recover symbol data; filtering samples of the plurality of antenna-specific receive signals with a filter bank that separates antenna-specific receive signals for a corresponding source device of the one or more source devices, to produce a filtered output; performing a cross correlation on the filtered output to generate a plurality of cross correlation outputs, one for each of the plurality of antennas, excluding the at least one designated antenna, to produce cross correlation outputs that comprise separate cross correlation samples for each antenna state; storing the cross correlation samples mapped by antenna state and filter bank index associated with a corresponding source device; converting the cross correlation outputs to an angle of arrival vector for each source device of the one or more source devices; and deriving a location estimate for the corresponding source device of the one or more source devices based, at least in part, on the angle of arrival vector for the corresponding source device.

In still another form, an apparatus is provided comprising: a plurality of antennas configured to detect wireless transmissions spanning a frequency bandwidth that may include a transmission from each of one or more source devices, wherein a transmission from a source device occupies a unique set of subcarriers in a sub-band of the frequency bandwidth; a first radio receiver coupled to a first antenna of the plurality of antennas, the first radio receiver configured to generate at reference receive signal; a second radio receiver; a switch coupled to the plurality of antennas excluding the first antenna, and to the second radio receiver, the switch configured to switch over time among the plurality of antennas excluding the first antenna to connect one of the plurality of antennas, excluding the first antenna, to the second radio receiver to generate a plurality of antenna-specific receive signals for a corresponding antenna state, each for a different time interval; and a processor coupled to the first radio receiver and the second radio receiver, wherein the processor is configured to: compute a first channel estimate based on the at least one reference receive signal; decode at least a portion of a frame for one of the transmissions based on the first channel estimate to recover symbol data; filter samples of the plurality of antenna-specific receive signals with a filter bank that separates antenna-specific receive signals for a corresponding source device of the one or more source devices, to produce a filtered output; perform a cross correlation on the filtered output to generate a plurality of cross correlation outputs, one for each of the plurality of antennas, excluding the at least one designated antenna, to produce cross correlation outputs that comprise separate cross correlation samples for each antenna state; store the cross correlation samples mapped by antenna state and filter bank index associated with a corresponding source device; convert the cross correlation outputs to an angle of arrival vector for each source device of the one or more source devices; and derive a location estimate for the corresponding source device of the one or more source devices based, at least in part, on the angle of arrival vector for the corresponding source device.

In still another form, one or more non-transitory computer readable storage media are provided encoded with instructions that, when executed by a processor of a wireless communication device, cause the processor to: cause detection at a plurality of antennas of at least one wireless device, of energy spanning a frequency bandwidth that may include a transmission from each of one or more source devices, wherein a transmission from a source device occupies a unique set of subcarriers in a sub-band of the frequency bandwidth; generate at least one reference receive signal from at least one designated antenna; switch among the plurality of antennas, excluding the at least one designated antenna, over time, to generate a plurality of antenna-specific receive signals for a corresponding antenna state, each for a different time interval; compute a first channel estimate based on the at least one reference receive signal; decode at least a portion of a frame for one of the transmissions based on the first channel estimate to recover symbol data; filter samples of the plurality of antenna-specific receive signals with a filter bank that separates antenna-specific receive signals for a corresponding source device of the one or more source devices, to produce a filtered output; perform a cross correlation on the filtered output to generate a plurality of cross correlation outputs, one for each of the plurality of antennas, excluding the at least one designated antenna, to produce cross correlation outputs that comprise separate cross correlation samples for each antenna state; store the cross correlation samples mapped by antenna state and filter bank index associated with a corresponding source device; convert the cross correlation outputs to an angle of arrival vector for each source device of the one or more source devices; and derive a location estimate for the corresponding source device of the one or more source devices based, at least in part, on the angle of arrival vector for the corresponding source device.

The above description is intended by way of example only. Various modifications and structural changes may be made therein without departing from the scope of the concepts described herein and within the scope and range of equivalents of the claims.

What is claimed is:

1. A method comprising:
   detecting at a plurality of antennas of at least one wireless device, energy spanning a frequency bandwidth that may include a transmission from each of one or more source devices, wherein a transmission from a source device occupies a unique set of subcarriers in a sub-band of the frequency bandwidth;
   generating at least one reference receive signal from at least one designated antenna;
   switching among the plurality of antennas, excluding the at least one designated antenna, over time, to generate a plurality of antenna-specific receive signals for a corresponding antenna state, each for a different time interval;
   computing a first channel estimate based on the at least one reference receive signal;
   decoding at least a portion of a frame for one of the transmissions based on the first channel estimate to recover symbol data;
   computing a second channel estimate based on the plurality of antenna-specific receive signals;
   generating a composite channel estimate from at least one of the first channel estimate and the second channel estimate;
   using the composite channel estimate, computing an angle of arrival vector for a transmission from a corresponding source device of the one or more source devices; and
   deriving a location estimate for the corresponding source device of the one or more source devices based at least in part on the angle of arrival vector for the corresponding source device.

2. The method of claim 1, further comprising equalizing the first channel estimate to produce an equalized first channel estimate, and wherein decoding is based on the equalized first channel estimate.

3. The method of claim 2, further comprising determining, for the symbol data, a nearest constellation point of a modulation scheme, and wherein computing the second channel estimate uses the nearest constellation point of the modulation scheme as known values when computing the second channel estimate from the plurality of antenna-specific receive signals.

4. The method of claim 3, further comprising:
based on the decoding, storing resource unit information describing allocation of a sub-band to a corresponding one of the one or more source devices; and
wherein the computing the angle of arrival vector is based on the resource unit information.

5. The method of claim 4, wherein the computing comprises computing a plurality of angle of arrival vectors, one for each of a plurality of sub-bands, each of which is associated with a corresponding one of a plurality of source devices, further comprising:
using stored data derived from a received trigger frame, mapping respective ones of the angle of arrival vectors computed for the plurality of sub-bands to an address or identifier information for respective ones of the plurality of source devices.

6. The method of claim 1, further comprising:
performing start-of-packet detection and synchronization based at least on the at least one reference receive signal; and
wherein the computing the first channel estimate is based on training data included in a detected frame.

7. The method of claim 6, wherein computing the composite channel estimate is based on the second channel estimate.

8. A method comprising:
detecting at a plurality of antennas of at least one wireless device, energy spanning a frequency bandwidth that may include a transmission from each of one or more source devices, wherein a transmission from a source device occupies a unique set of subcarriers in a sub-band of the frequency bandwidth;
generating at least one reference receive signal from at least one designated antenna;
switching among the plurality of antennas, excluding the at least one designated antenna, over time, to generate a plurality of antenna-specific receive signals for a corresponding antenna state, each for a different time interval;
computing a first channel estimate based on the at least one reference receive signal;
decoding at least a portion of a frame for one of the transmissions based on the first channel estimate to recover symbol data;
filtering samples of the plurality of antenna-specific receive signals with a filter bank that separates antenna-specific receive signals for a corresponding source device of the one or more source devices, to produce a filtered output;
performing a cross correlation on the filtered output to generate a plurality of cross correlation outputs, one for each of the plurality of antennas, excluding the at least one designated antenna, to produce cross correlation outputs that comprise separate cross correlation samples for each antenna state;
storing the cross correlation samples mapped by antenna state and filter bank index associated with a corresponding source device;
converting the cross correlation outputs to an angle of arrival vector for each source device of the one or more source devices; and
deriving a location estimate for the corresponding source device of the one or more source devices based, at least in part, on the angle of arrival vector for the corresponding source device.

9. The method of claim 8, further comprising:
equalizing the first channel estimate to produce an equalized first channel estimate;
demodulating the equalized first channel estimate to produce demodulated data; and
wherein decoding is based on the demodulated data.

10. The method of claim 1, further comprising:
equalizing the first channel estimate to produce an equalized first channel estimate;
demodulating the equalized first channel estimate to produce demodulated data, wherein decoding includes decoding the demodulated data for an entire frame;
modulating the demodulated data to produce reference remodulated frequency domain symbols; and
storing the reference remodulated frequency domain symbols;
wherein computing the second channel estimate is based on frequency domain symbols derived from a frequency domain transform performed on the plurality of antenna-specific receive signals and based on the reference remodulated frequency domain symbols.

11. The method of claim 1, wherein the at least one designated antenna resides on a first wireless device and the plurality of antennas, excluding the at least one designated antenna, resides on a second wireless device.

12. The method of claim 8, wherein converting the cross correlation outputs to an angle of arrival vector for each source device of the one or more source devices is based on allocation of the sub-bands to each of the one or more source devices.

13. An apparatus comprising:
a plurality of antennas configured to detect wireless transmissions spanning a frequency bandwidth that may include a transmission from each of one or more source devices, wherein a transmission from a source device occupies a unique set of subcarriers in a sub-band of the frequency bandwidth;
a first radio receiver coupled to a first antenna of the plurality of antennas, the first radio receiver configured to generate at least one reference receive signal;
a second radio receiver;
a switch coupled to the plurality of antennas excluding the first antenna, and to the second radio receiver, the switch configured to switch over time among the plurality of antennas excluding the first antenna to connect one of the plurality of antennas, excluding the first antenna, to the second radio receiver to generate a plurality of antenna-specific receive signals for a corresponding antenna state, each for a different time interval;
a processor coupled to the first radio receiver and the second radio receiver, wherein the processor is configured to:
compute a first channel estimate based on the at least one reference receive signal;
decode at least a portion of a frame for one of the transmissions based on the first channel estimate to recover symbol data;
compute a second channel estimate based on the plurality of antenna-specific receive signals;
generate a composite channel estimate from at least one of the first channel estimate and the second channel estimate;
using the composite channel estimate, compute an angle of arrival vector for a transmission from a corresponding source device of the one or more source devices; and derive a location estimate for the corresponding source device of the one or more source devices based at least in part on the angle of arrival vector for the corresponding source device.

14. The apparatus of claim 13, wherein the processor is further configured to equalize the first channel estimate to produce an equalized first channel estimate, and to decode based on the equalized first channel estimate.

15. The apparatus of claim 14, wherein the processor is further configured to determine, for the symbol data, a nearest constellation point of a modulation scheme, and wherein the processor is configured to compute the second channel estimate using the nearest constellation point of the modulation scheme as known values.

16. The apparatus of claim 15, wherein the processor is configured to:
based on decoding of at least a portion of the frame, store resource unit information describing allocation of a sub-band to a corresponding one of the one or more source devices;
compute the angle of arrival vector based on the resource unit information.

17. The apparatus of claim 16, wherein the processor is configured to:
compute a plurality of angle of arrival vectors, one for each of a plurality of sub-bands, each of which is associated with a corresponding one of a plurality of source devices; and
using stored data derived from a received trigger frame, map respective ones of the angle of arrival vectors computed for the plurality of sub-bands to address or identifier information for respective ones of the plurality of source devices.

18. The apparatus of claim 13, wherein the processor is configured to:
perform start-of-packet detection and synchronization based at least on the at least one reference receive signal; and
compute the first channel estimate based on training data included in a detected frame.

19. The apparatus of claim 13, wherein the processor is configured to:
equalize the first channel estimate to produce an equalized first channel estimate;
demodulate the equalized first channel estimate to produce demodulated data;
modulate the demodulated data to produce reference remodulated frequency domain symbols; and
store the reference remodulated frequency domain symbols; and
compute the second channel estimate based on frequency domain symbols derived from a frequency domain transform performed on the plurality of antenna-specific receive signals and based on the reference remodulated frequency domain symbols.

20. The apparatus of claim 19, wherein the processor is configured to compute the composite channel estimate based on the second channel estimate.

* * * * *